US012773648B2

(12) United States Patent
Choi

(10) Patent No.: US 12,773,648 B2
(45) Date of Patent: Oct. 27, 2026

(54) 3D COLLECTION CARD SYSTEM

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 19/234,362

(22) Filed: Jun. 11, 2025

(65) Prior Publication Data

US 2026/0042032 A1 Feb. 12, 2026

(51) Int. Cl.

*A63H 33/22* (2006.01)
*B65D 25/10* (2006.01)
*B65D 43/16* (2006.01)
*G02B 30/36* (2020.01)

(52) U.S. Cl.

CPC ........... *A63H 33/22* (2013.01); *B65D 25/108* (2013.01); *B65D 43/162* (2013.01); *G02B 30/36* (2020.01)

(58) Field of Classification Search

CPC ........ A63H 33/22; G02B 30/36; G02B 30/37; G02B 23/105; B65D 25/108; B65D 25/10; B65D 85/38; B65D 43/162; A45C 11/38

USPC ..... 206/450, 579, 316.1; 359/616, 467, 468, 359/466

See application file for complete search history.

(56) References Cited

U.S. PATENT DOCUMENTS 3,197,888 A * 8/1965 Held ........................ G09B 1/24 434/257
3,590,498 A * 7/1971 Landzerg ................ G09B 3/06 434/327
4,093,010 A * 6/1978 Hunley .................. A45C 13/02 D3/319
4,549,785 A * 10/1985 Vitrac .................... G02B 30/37 40/365
5,309,280 A * 5/1994 Jones ..................... G02B 30/37 359/474
5,499,136 A * 3/1996 Jones ..................... G02B 30/37 359/477
7,304,796 B2 * 12/2007 Hosoda .................. G02B 30/37 359/462
9,415,621 B2 * 8/2016 Fahrer ....................... G09B 5/02
10,203,773 B2 * 2/2019 Hviid ................... B65D 77/006
D978,912 S * 2/2023 Choi ............................ D14/496
12,501,976 B2 * 12/2025 Kemp ....................... A45C 3/02
2007/0163911 A1 * 7/2007 Gelardi .................. B65D 43/16 206/473
2011/0013276 A1 * 1/2011 Choi ...................... G02B 30/37 359/477
2018/0017803 A1 * 1/2018 Chang .................... G02B 30/36
2020/0110241 A1 * 4/2020 Choi ........................ G02B 7/02
2023/0348141 A1 * 11/2023 Zhurin ................... B65D 75/54

* cited by examiner

*Primary Examiner* — Steven A. Reynolds
(74) *Attorney, Agent, or Firm* — BACON & THOMAS, PLLC

(57) ABSTRACT

The present invention relates to a 3D collection card system including a book case, a 3D collection card, and a 3D observation device, wherein 3D pictures are configured on both left and right sides of a center line of the 3D collection card, and a fixing means is provided at a lower end thereof, the 3D observation device is provided with a blocking film and a fixing base on which left and right lenses folded to the left and right and 3D cards are mounted in link with a resilient device, each of the 3D collection card and the 3D observation device is configured in the form of a book, so that a user uses the 3D observation device with one hand and frequently replaces the 3D collection card with the other one hand.

3 Claims, 6 Drawing Sheets

3D COLLECTION CARD SYSTEM

CROSS-REFERENCE TO RELATED APPLICATION

This application claims under 35 U.S.C. § 119(a) the benefit of Korean Patent Application No. 10-2024-0094203 filed on July 17. 2024, the entire contents of which are incorporated herein by reference.

BACKGROUND

(a) Technical Field

The present invention relates to a three-dimensional (3D) collection card system, which configures a collection card as a 3D card, includes a three-dimensional observation device for observing the 3D card, and configures a case for storing the 3D card and the 3D observation device in a form of a book structure.

(b) Background Art

Images of games, sports, tourist attractions, performances, theme parks, and various cards such as Christmas cards, birthday cards, official cards, promotional cards, museum collection cards, and cartoon cards are published in a form of collection cards. However, such a collection card provides only a 2D photograph and a 2D printed image, and a method for configuring a collection card that can see the 2D photograph and the 2D printed image in 3D is not disclosed.

It is known that a 3D image has a very large visual effect, such as a visual effect more than doubled when the image is twice as large, but as a screen is larger, a distance between the center of left and right images and the center of right and left lenses, and a spacing between left and right eyes of a user do not match, and thus a 3D image of a large screen is not provided.

As an example, a conventional 3D view device in which a 3D image is provided as a wheel-type rotating device as illustrated in a reference diagram of FIG. 7 cannot be applied to a collection card and a book structure because a thickness of the device itself is as thick as 80 mm and a weight is as heavy as 100 g or more.

In addition, the number of screens of the provided image is only 14 frames (7 scenes), which are used only for providing a simple picture.

In addition, since the screen is small in the form of a small film having a 3D screen size of only 12 mm×10 mm and needs to be printed on a film surface, a resolution is rough and light needs to be transmitted from a back surface to view an image. Therefore, mass production by a printing method cannot be performed, and film production has been limited in recent years due to toxic chemicals of films.

An international standard of a post card, which is a type of collection card, is a maximum of 150 mm×105 mm to a minimum of 140 mm×90 mm.

In addition, when a printed matter such as a collection card and a card book deviates from a standard of a plate form of a publication, binding and printing publication as a book become difficult.

A typical book thickness of a publication is 20 to 50 mm. When the thickness of such a book is exceeded, a shape of the book is not beautiful, a weight becomes heavy, and the circulation and the collection become inconvenient.

It is known that a plate-type standard of such a book is 257 mm×182 mm for a 4.6-fold plate (B5 plate), 182×128 mm for the 4.6-fold plates (B6), 297×210 mm for an A4-fold plate, 210×148 mm for an A5-fold plate, and 148 mm×105 mm for an A6-fold plate in terms of width and length.

Conventional 3D devices cannot be applied to the above-described book thicknesses and plate types because the total volume and weight are excessive due to front and rear lengths of a lens based on a focal length and left and right lengths of left and right lenses.

Since an image of a printed publication is not an image having a self-luminous function such as a light-transmitting film or a smartphone, 3D observation is possible only when the image is irradiated with external light.

However, existing 3D devices have a structure in which external light is blocked and light is transmitted from the back surface of the film, and thus cannot be applied to a 3D collection card or the like without its own light source, such as a printed matter.

PRIOR ART DOCUMENTS

Patent Documents (Patent Document 0001) KR Application No. 10-2017-0120147

(Patent Document 0002) KR Application No. 10-2016-0078983

(Patent Document 0003) KR Application No. 20-2003-0026604

(Patent Document 0004) KR Application No. 20-2003-0039212

SUMMARY OF THE DISCLOSURE

In view of the above problems, the present invention provides a method for configuring a 3D collection card which may print a collection card as a 3D image and clearly observe the collection card.

An entire system is constituted by 3D collection cards, a 3D observation device, and a book-type book case storing the 3D collection cards and the 3D observation device, and in the 3D collection card, a center line is configured in a vertical direction, and a left-eye picture and a right-eye picture are formed on both left and right sides of the center line.

The 3D observation device has a handle at a lower portion based on a blocking film, and left and right lens plates provided with left and right lenses are provided at a front end of the blocking film so as to be folded on both the left and right sides of the blocking film.

A fixing base that may draw in and out the 3D card is formed at a rear end of the blocking film.

The 3D observation device is configured to be stored in a separate book case in order to observe the 3D collection card in a 3D image.

The 3D observation device includes a handle at a lower portion thereof, and a thin-film structure blocking film which is configured to elongate in a front-rear longitudinal direction above the handle, and has a length which is the same as a focal length between left and right lenses and a thickness of 1 mm or more and less than 10 mm.

Left and right lenses and left and right lens plates folded to both left and right sides are configured at a front end of the blocking film, and a fixing base on which the 3D collection card is mounted downward from the top to the bottom is provided at a rear end of the blocking film, and is configured to be coupled to a resilient device.

The book case includes a card case storing the 3D collection card and a 3D device case storing the 3D observation device inside a book cover, and each of the card case and the 3D device case is configured in the form of a book.

The 3D observation device is configured such that a center fixing groove configured at a lower end of the 3D collection card is fixed to a fixing pin provided at a lower portion of the fixing base of the 3D observation device, so that a center of each of left and right eye pictures of the 3D collection card, a center of left and right lenses, and a spacing between left and right eyes of a user are matched.

As another configuration method of the book case, a card case and a 3D device case are provided inside one book cover.

As yet another configuration method of the book case, a book cover structure of the card case and the 3D device case is made of transparent plastic.

As still yet another configuration method of the book case, the book case is constituted by the card case storing the 3D collection card and the 3D observation device.

As further still another configuration method of the book case, the book case is constituted by a book case in which the 3D collection card is separated.

The 3D image provided with such the 3D collection card is provided with a large screen that is 30 times larger than a 3D image in the form of a conventional film.

When a minimum thickness of the 3D observation device can be set to about 25 mm, which is a standard thickness of a book, the 3D observation device can be stored and displayed as a book, and can be easily carried, stored, and distributed.

In such a card case, up to 25 to 50 3D collection cards are stored, and when 3D images are formed on front and back surfaces, up to 100 scenes (200 frames) are provided, so that 3D images can be provided 10 times or more compared to the number of 7 scenes provided by the conventional 3D device.

A 3D observation device having a structure in which both the left and right peripheries are open and external light is irradiated to a surface of the 3D collection card irradiates the surface of the 3D image of the collection card, which is a printed matter, without a separate lighting device, so that a bright image can be viewed.

A 3D observation device in which a handle and a blocking film are formed of a single thin plate structure has a weight of ⅓ as compared with the weight of the conventional 3D device such as a reference diagram of FIG. 7, so that children and the elderly can lightly use the 3D observation device with one hand.

The handle provided at the bottom of the 3D observation device can use an entire structure of the 3D observation device with one hand and replace the 3D collection card with the other hand from time to time, so that a plurality of 3D collection cards can be replaced from time to time.

A structure of a fixing base of the 3D observation device that pulls in and fixes the 3D collection card from above to below has an effect of stably fixing the 3D collection card.

In addition, in the present invention, the 3D collection card can be viewed in 3D as long as the 3D collection card is mounted, and thus the use method thereof is very simple.

In addition, since the present invention is provided in a size of 30 times or more as compared with a conventional wheel type 3D viewer, an audiovisual effect thereof is great.

The resilient device configured in the fixing device for mounting the 3D collection card is a resilient structure such as a circular spring having elasticity, and always provides elasticity, durability, and stability even when the 3D collection card is replaced from time to time.

The central fixing groove formed at the lower end of the center line of the 3D collection card or the lower part of the 3D observation device is fixed to the central fixing pin of the fixing base so that the 3D collection card is always mounted at the center of the 3D observation device, so that the left and right centers of the 3D collection card and the respective centers of the left and right lens plates are automatically matched with the left and right eyes of the user, thereby making it possible to observe the 3D image of the 3D collector card.

The front-rear length of the blocking film of the 3D observation device is configured to be the same as the focal length of the left and right lenses, so that the focal length of the left and the right lenses automatically coincide with each other without a separate focal adjustment action during use.

Such a 3D collection card provides images of the maximum size in a range of a viewing angle of an observer and the 3D observation device is configured in a book form by being configured with a minimum volume and structure and applied to the various printing plate types of existing books.

Therefore, there is an effect that the 3D collection card can be used, carried, and stored like a book, and can be distributed as the book.

In addition, multiple 3D collection cards and 3D observation devices are each merchandise-unitized in the form of a separate book, so that the 3D collection cards can be repeatedly provided separately without redundant 3D observation devices, so that the 3D collection cards can be continuously used, collected, and stored.

DETAILED DESCRIPTION

Figure 1A:
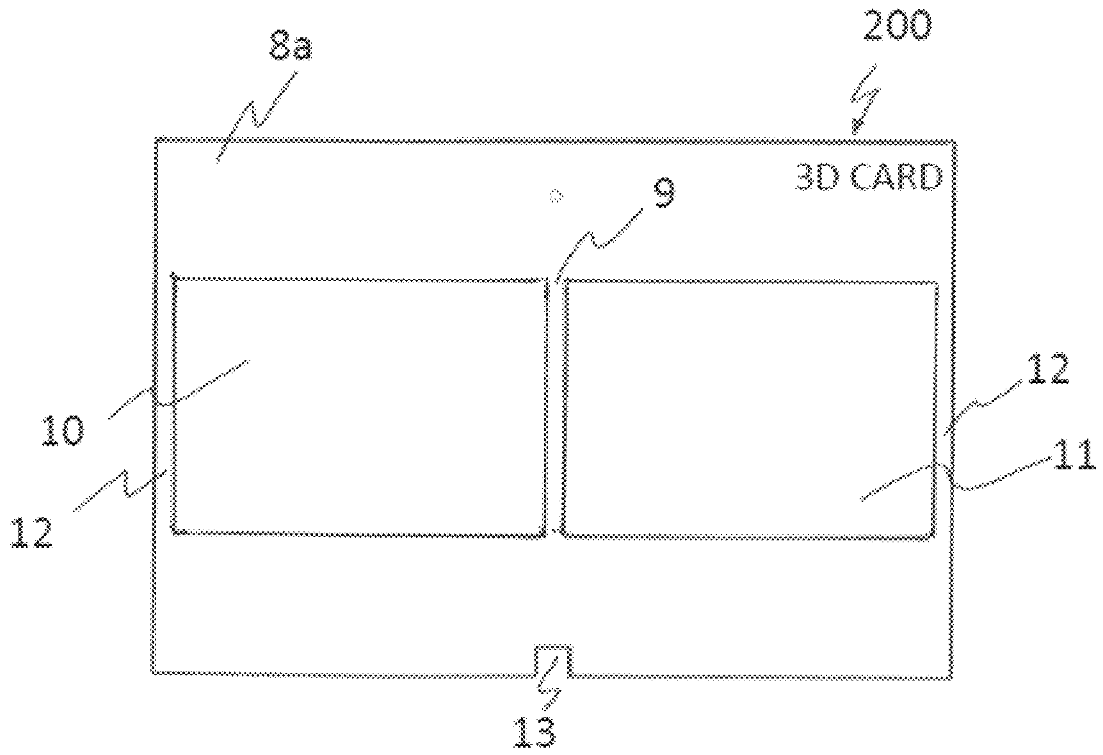
FIG. 1A is a front configuration explanatory diagram of a 3D collection card.

As illustrated in the drawings, the present invention is characterized in that a 3D collection card 200, a 3D observation device 300, and a book case 100 for storing the same are coupled into one structure to form a 3D collection card.

The 3D collection card 200 of the present invention is applied to a plate-like size of a book, and is configured to have a size such that a 3D image of the 3D collection card may be viewed with a maximum size within a left and right eye spacing of a person.

The 3D collection card 200 is configured as a 3D picture or a 3D photograph, and the 3D observation device 300 is configured to be accommodated in the book case 100 configured to have an open structure in which external light is incident, and configured to have a minimum volume, thickness, and weight and configured to be within a publication plate-like standard, which will be described in detail with reference to the drawings.

Figure 1B:
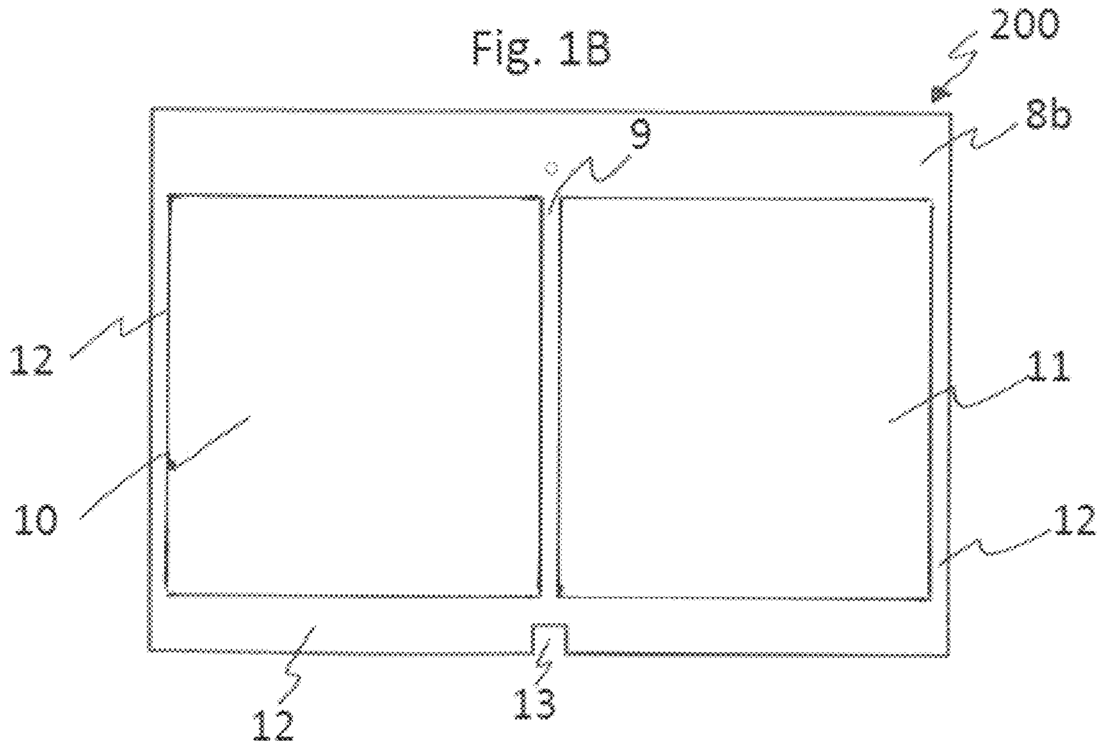
FIG. 1B is a rear configuration explanatory diagram of the 3D collection card.

As illustrated in FIGS. 1A and 1B, the 3D collection card 200 constitutes a center line 9 that is vertically displayed in the middle of one surface of the card, a 3D left-eye image 10 and a 3D right-eye image 11 on both left and right sides of the center line 9, and a finishing frame 12 on upper, lower left, and right peripheries of the left and right-eye images 10 and 11.

In an embodiment, a thickness of the 3D collection card 200 is 0.5 mm to 2 mm, and it is recommended to use a card made of plastic or hard paper.

Upper, lower, left, and right sizes of the 3D collection card 200 are configured based on 140×90 mm, which is an international standard of a postcard, but are not limited thereto.

The 3D observation device 300 is configured such that a spacing between centers of the 3D left-eye picture 10 and the 3D right-eye picture 11 is less than 65 mm, which is a spacing between left and right eyes of the user, and the centers of the left and right-eye pictures 10 and 11 are matched with the centers of the right and left lenses 20 and 22 and the right and left eyes of the user.

The left and right-eye pictures 10 and 11 include all images that may be printed, such as photographs, illustrations, cartoons, pictures, and the like.

Specifically, for example, when a total size of the 3D collection card 200 is 140×90 mm, the center line 9 of the 3D card 200 is 4 mm, widths of the left and right finishing frames 12 are 5 mm, an upper finishing frame 12 is 20 mm, and a width of a lower finishing frame 12 is 10 mm, sizes of the left and right-eye pictures 10 and 11 are left and right 63 mm×upper and lower 60 mm.

The size of 63×60 mm (3780 $mm^2$) of the 3D picture provides a large 3D image about 31.5 times larger than the 10×12 mm (120 $mm^2$) 3D film of a conventional 3D device.

Since a center fixing groove 13 formed at a lower end of the center line 9 of the 3D collection card 200 is fixed in connection with a center fixing pin 17*a* of a fixing base 17, the center line 9 is always aligned with a vertical plane of a blocking film 15.

Therefore, a left and right center of the left and right eye FIGS. 10 and 11 and the center of left or right lens plates 20 and 22 automatically match the left or right eyes of the user. The fixing groove 13 may be provided in a lower portion of the 3D observation device 300.

The 3D observation device 300 should be light in weight so that children may hold with one hand and observe, and the 3D collection card 200 may be replaced with one hand from time to time, so that the structure thereof should be concise and robust, and the weight should be as light as possible.

Figure 2A:
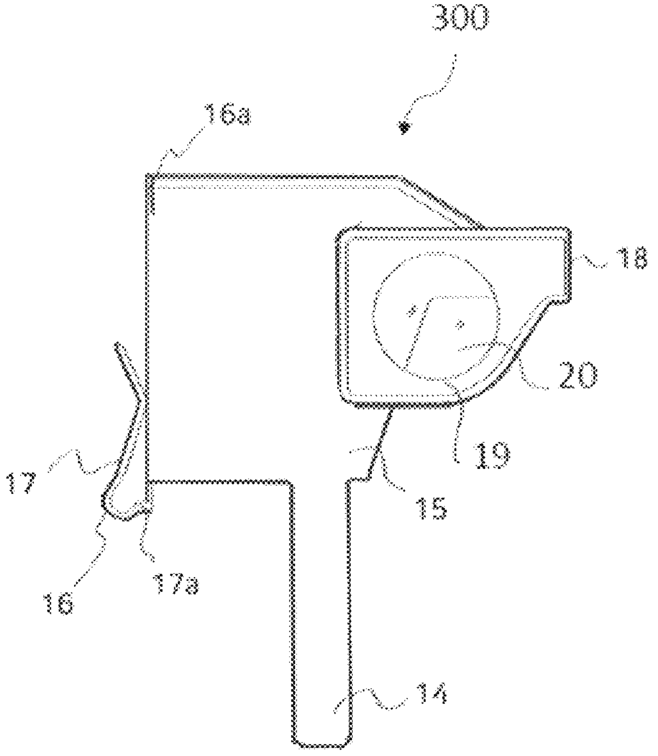
FIG. 2A is a configuration explanatory diagram of a 3D observation device.

Therefore, in the present invention, a handle 14 is configured below the center of gravity of the 3D observation device 300 so that the 3D collection card 200 may be replaced from time to time, and the blocking film 15 is configured above the handle 14, and the structure of the blocking film 15 has a purpose of blocking and separating the left and right eye images 10 and 11 of the 3D collection card 200 as illustrated in FIG. 2A.

Figure 2B:
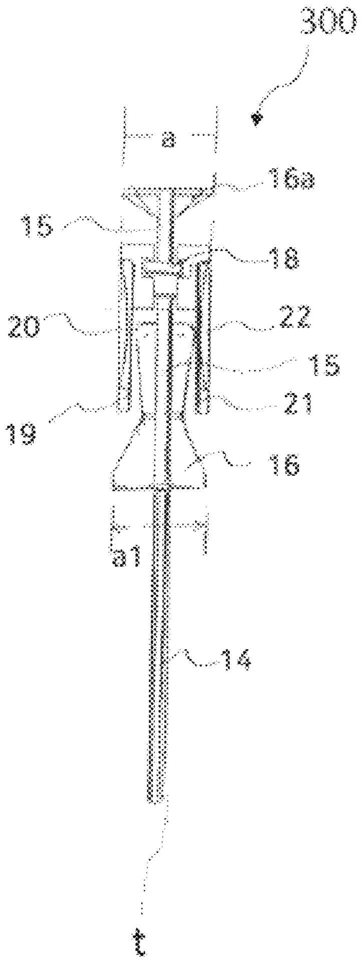
FIG. 2B is a configuration explanatory diagram of a thickness b of the 3D observation device.

Therefore, as illustrated in FIG. 2B, a thickness t of the blocking film 15 is preferably composed of a thin plate of 2 to 5 mm depending on a material within 1 mm to 10 mm.

A vertical length of the blocking film 15 is configured to be equal to or less than a vertical length of the center line 9 of the 3D collection card 200, so that the blocking film 15 vertically blocks the space between the left and right eye pictures 10 and 11 to prevent double images in which left and right eye images overlap each other.

Figure 3:
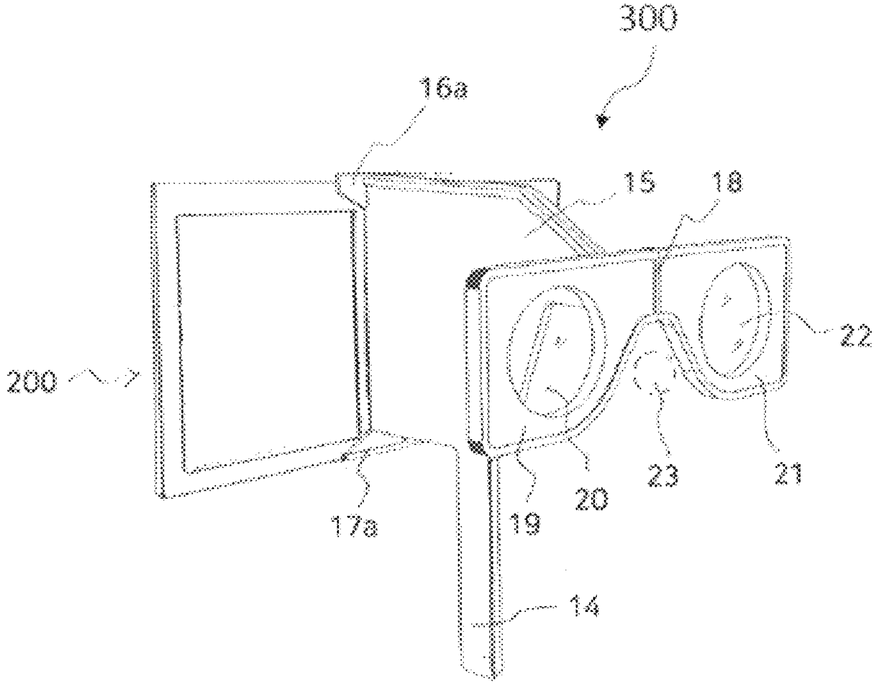
FIG. 3 is an explanatory diagram in use of the 3D observation device.
Figure 4:
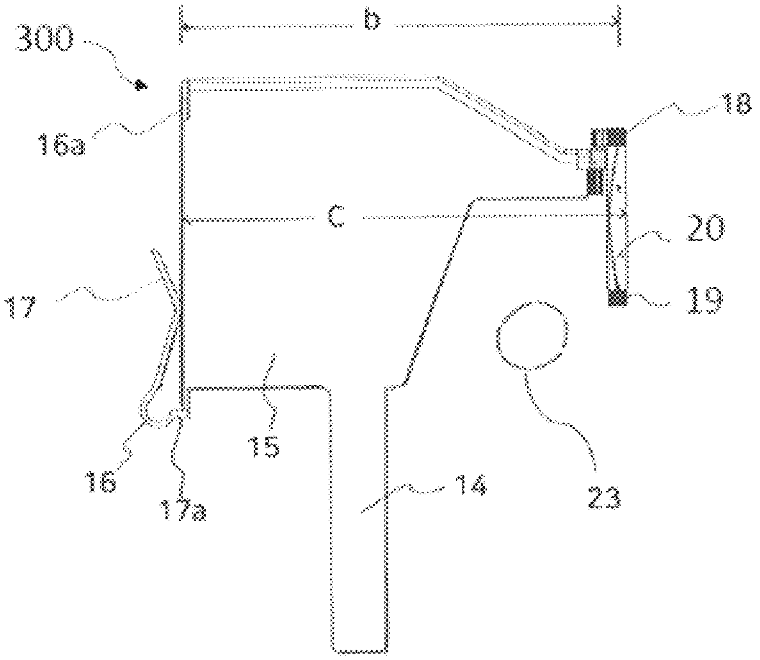
FIG. 4 is a configuration explanatory diagram of a handle and a blocking film of the 3D observation device.

As illustrated in FIG. 2A, and FIGS. 3 and 4, the 3D observation device 300 includes left and right lenses 20 and 22 at the front end of the blocking film 15, and includes left and right lens plates 19 and 21 folded to the left and right, a hinge 18, and an inlet groove 23 into which the user's nose is drawn.

A rear end of the blocking film 15 includes the fixing base 17 on which the 3D collection card 200 is mounted, a resilient device 16, and the handle 14, and the 3D observation device 300 is located at the center of gravity of the whole.

Therefore, the 3D observation device 300 is constituted by the blocking film 15, the fixing base 17, and the left and right lens plates 19 and 21 provided with the left and right lenses 20 and 22, and the handle 14 is constructed at a lower center of a gravity position of the components, so that the entire 3D observation device 300 may be used with one hand by the handle 14, and the 3D collection card 200 may be replaced from time to time with one hand.

As illustrated in FIG. 4, since peripheries of the blocking film 15 of the 3D observation device 300 are all open, external light irradiates the surface of the 3D collection card 200 mounted on the fixing base 17, so that clear 3D image observation is possible.

As illustrated in FIG. 2A and FIG. 4, a fixing base 17 for mounting the 3D collection card 200 is formed at the rear end of the blocking film 15, and a resilient device 16 having a resilient angle equal to or greater than a circular or right angle structure is formed between the fixing base 17, which pulls in and fixes the 3D collection card 200 from above to below, and the blocking film 15 so that the 3D collection card 200 may be fixed resiliently at all times.

When a structure of the resilient device 16 is configured in a circular shape as shown in FIG. 4, the resilient device 16 functions like a spring and always provides resilience to the fixing base 17, so that durability of resilience may be maintained even when the 3D collection card 200 is pulled in and out from time to time.

Since the structure of the fixing base 17 is a structure in which the 3D collection card 200 is mounted from top to bottom, an auxiliary device may be added as necessary, and multiple 3D collection cards 200 may be mounted and pulled out one by one, so that a 3D image may be continuously viewed.

As illustrated in FIGS. 2 and 3, at a front end of the blocking film 15, the left lens plate 19 provided with the left lens 20 and the right lens plate 21 provided with the right lens 22 are respectively connected by hinges 18, and are configured to rotate, fold, and unfold on both the left and right sides of the blocking film 15.

The 3D observation device 300 is configured so that when folded as illustrated in FIG. 2B, a maximum thickness a is configured to be within 20 to 50 mm, and a thickness of an entire book case 100 incorporating the 3D observation device 300 is also configured to be not less than 20 mm and not more than 50 mm.

As illustrated in FIG. 2B, the thickness a of the 3D observation device 300 determines the thickness of the book case 100. Therefore, when the left and right lens plates 19 and 21 are folded on both the left and right sides of the blocking film 15, the thickness a of the 3D observation device 300 is preferably configured to be within 25 mm.

A lateral width a1 of the resilient device 16 and the fixing base 17 is also configured to be the same width as or within the width a of FIG. 2B. Therefore, the maximum thickness a of all the components of the 3D observation device 300 should be within a as illustrated in FIG. 2B.

When such a structure of FIG. 3 is not used, as illustrated in FIGS. 2A and 2B, the left and right lens plates 19 and 21 are folded to both the left and right sides of the blocking film 15 by the hinges 18, so that the minimum thickness a is obtained.

That is, as the left and right lens plates 19 and 21 are folded, the left and right thicknesses a of the 3D observation device 300 are reduced, and thus the thickness and volume of the book case 100 are also reduced. Therefore, it is easy to store, send and collect the 3D collection card 200 as a book.

As illustrated in FIG. 4, a length b of the blocking film 15 is from the surface of the 3D collection card 200 to the left and right lens plates 19 and 21, and the length b of the blocking film 15 is configured to be the same so as to match a focal length c of the left and right lenses 20 and 22, so that a focal length c of the left, right lens 20 and 22 is configured to automatically match front and rear lengths b of the blocking films 15.

The focal lengths of the left and right lenses 20 and 22 configured in the 3D observation device 300 are configured to be 30 mm or more and 150 mm or less. When the focal length is 30 mm or less, magnification is high and resolutions of the left and right eye FIGS. 10 and 11 are impaired, and when the focal length is 150 mm or more, the length of the blocking film 15 is increased, which impedes the configuration in the form of a book due to an increase in the total volume.

In addition, as illustrated in FIGS. 3 and 4, an inlet groove 23 is formed at a lower center of the left and right lens plates 19 and 21 and at a lower front end of the blocking film 15 so that the user's nose is drawn in.

When the user's nose is drawn into the inlet groove 23, the left and right eyes of the user may be brought into close contact with the left and right lenses 20 and 22, so that a viewing angle by apertures of the left and right lens 20 and 22 is enlarged, so that a large-sized 3D image may be viewed.

In addition, the handle 14 provided below the blocking film 15 may be configured to be coupled to and separated from the blocking film 15.

As illustrated in FIG. 2B, the thickness a of the 3D observation device 300 determines the number of 3D cards 200 that can be mounted.

As an example, when the thickness a of the 3D observation device 300 is configured to be 25 mm, the thickness of the card case 1 may be configured to be within 30 mm even in consideration of thicknesses of book covers 7 and 7*a*.

With respect to the thickness of 25 mm of the card case 1, up to 50 3D cards 200 having a thickness of 0.5 mm may be stored and up to 25 3D cards 200 having a thickness of 1 mm may be mounted.

When the left and right eye pictures 10 and 11 are formed on the front and back surfaces of the 3D collection card 200, 100 types of 3D images are provided, which are twice as many as the left and right eye pictures.

Therefore, a story as a collection card may be given, and various planned publications such as a 3D insect picture book, a 3D plant picture book, a 3D tour guide book, or a 3D cartoon are possible.

The thickness of the card case 1 may adopt up to 10 mm to 60 mm including the thickness of the book cover 7. The quantity of 3D collection cards 200 having a thickness of 10 mm or less is limited, and when the thickness of the 3D collection cards 200 becomes 60 mm or more, the thickness as the book becomes large, and thus collection thereof becomes inconvenient.

Figure 7:
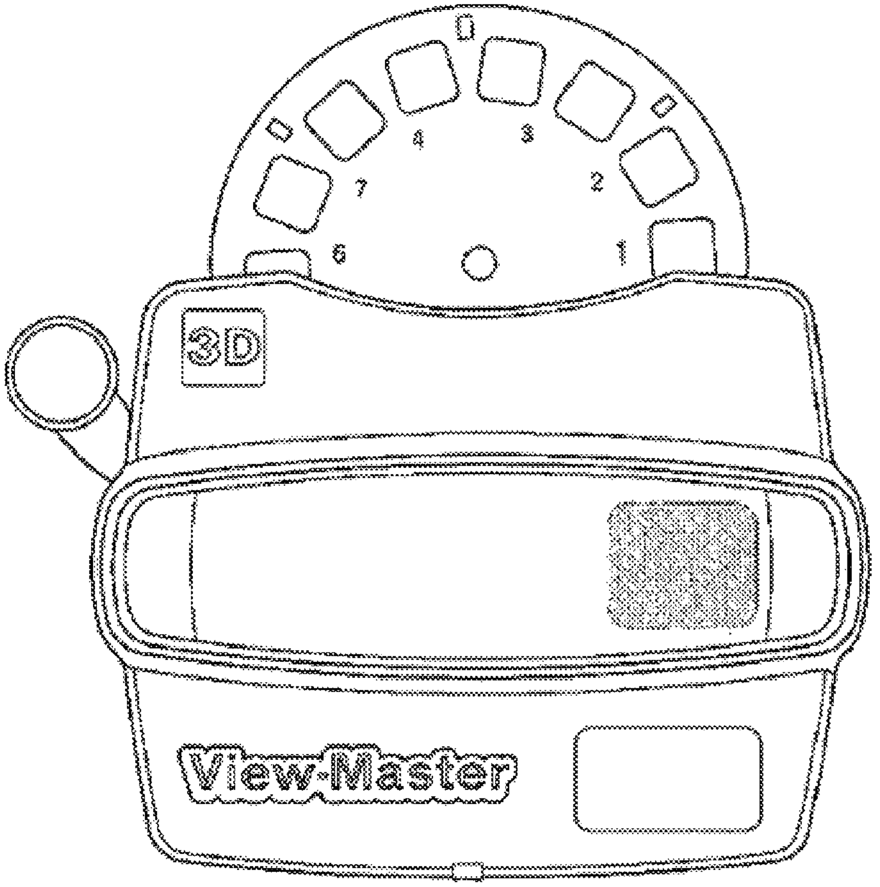
FIG. 7 is a reference diagram of an existing 3D device.

In the present invention, as illustrated in FIGS. 2A and 2B, 3 and 4, with respect to the components of the 3D observation device 300, only required components are configured to be simple and robust, and as a result of actual implementation, the present invention may be configured in a very light structure of 30 g. This is less than or equal to ⅓ of the weight of the existing 3D viewer device illustrated in FIG. 7, which is 110 g.

Figure 5:
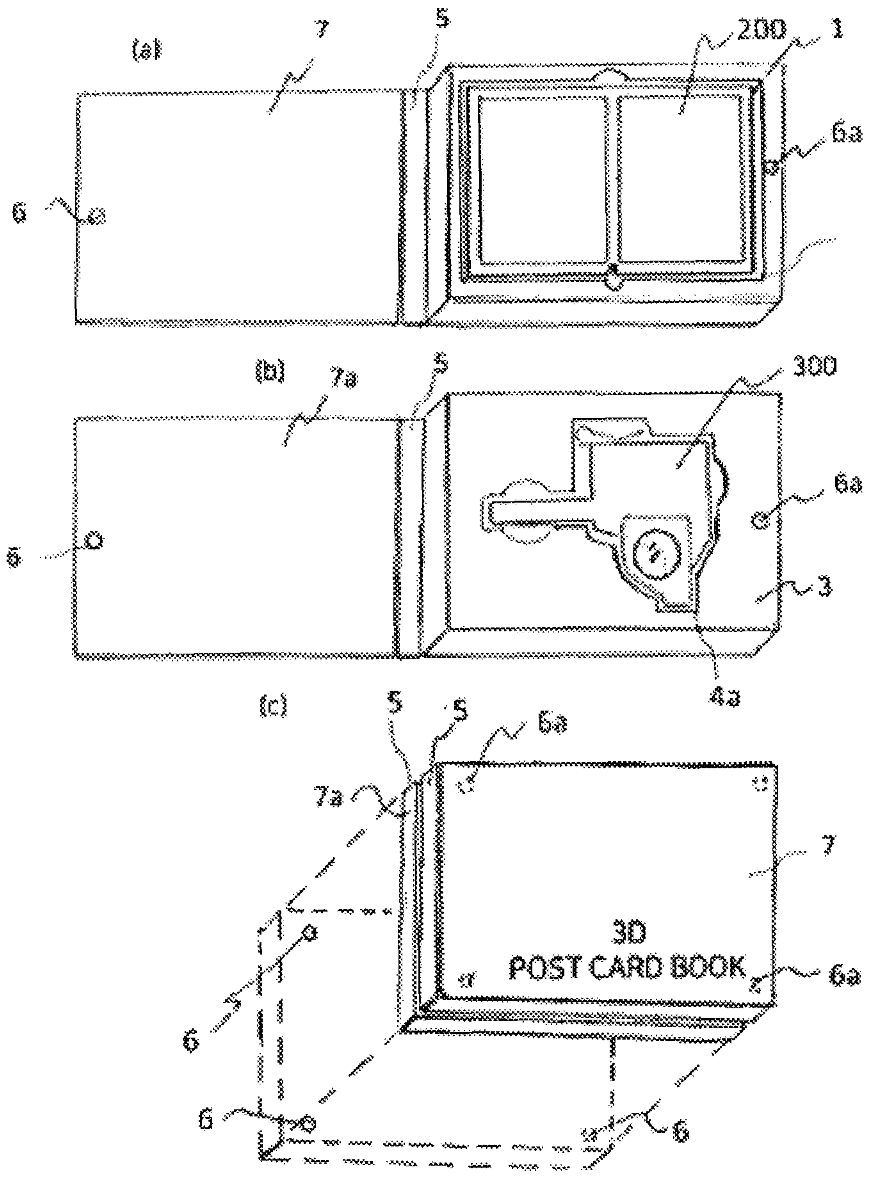
FIG. 5A is an explanatory diagram of a book case in which a collection card is stored.
FIG. 5B is an explanatory diagram of the 3D observation device.
FIG. 5C is a coupling explanatory diagram of the collection card and a 3D observation device case.

As shown in FIGS. 5A, 5B, and 5C, the present invention is configured in the form of the book, and may be separated into the card case 1 for storing the 3D collection card 200 and a 3D device case 3 for storing the 3D observation device 300, respectively, and configured as separate book units.

The book case 100 is composed of the card case 1 of FIG. 5A and a folding surface 5 or the book cover 7 of the 3D device case 3 as illustrated in FIG. 5B, and is composed of coupling devices 6 and 6*a* composed of a magnet and a magnetic material on one side of the book cover 7.

In addition, the coupling devices may cover or open the book covers 7 and 7*a* as illustrated in FIGS. 5A and 5B, and such a coupling device 6*a* may be configured in another known structure.

Figure 6A:
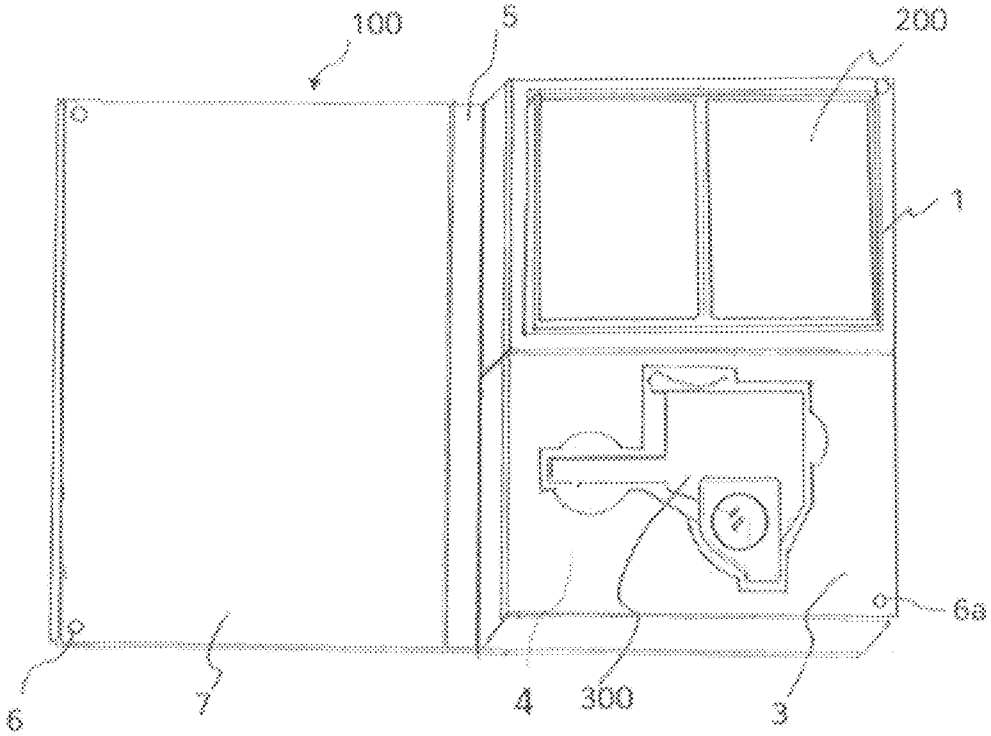
FIG. 6A is an explanatory diagram of the 3D observation device.

In the present invention, as illustrated in FIG. 6A, the structure of the card case 1 and the structure of the 3D device case 3 are constituted as one book structure on the inside and the bottom of the book case 100.

That is, as illustrated in FIG. 5A, the 3D collection card 200 is stored in a separate card case 1, which is constituted as a separate book case 100.

That is, as illustrated in FIG. 5B, the 3D observation device 300 is stored in a separate 3D device case 3, which is constituted as a separate book case 100.

As illustrated in FIG. 5C, the structures of FIGS. 5A and 5B are constituted as one book case 100 by the coupling devices 6 and 6*a*.

Since the card case 1 and the 3D device case 3 are separated from each other, there is an advantage that a user holding the 3D devices case 3 may continuously collect only the 3D collection card 200 of the card case 1 in a series as necessary.

The book covers 7 and 7*a* in FIGS. 5A, 5B, and 6 are made of transparent plastic so that internal stored contents may be seen from the outside.

In an embodiment, the size of the card case 1 and the size of the 3D device case 3 are set to 150 mm ×120 mm×20 to 60 mm in thickness to store the size of 140×90 mm in width×length of the 3D collection card 200, so that the 3D collection cards 200 and the 3D observation device 300 may be stored.

The sizes of the card case 1 and the 3D device case 3 in the form of a book may be applied to 210×148 mm of the Chinese edition (A5 edition) of the publication, and the thickness of the book is 20 to 60 mm, which is a book shape, and as a result, the present invention is also applied to 182×128 mm of the 4.6 edition (B6) of a printed matter.

Figure 6B:
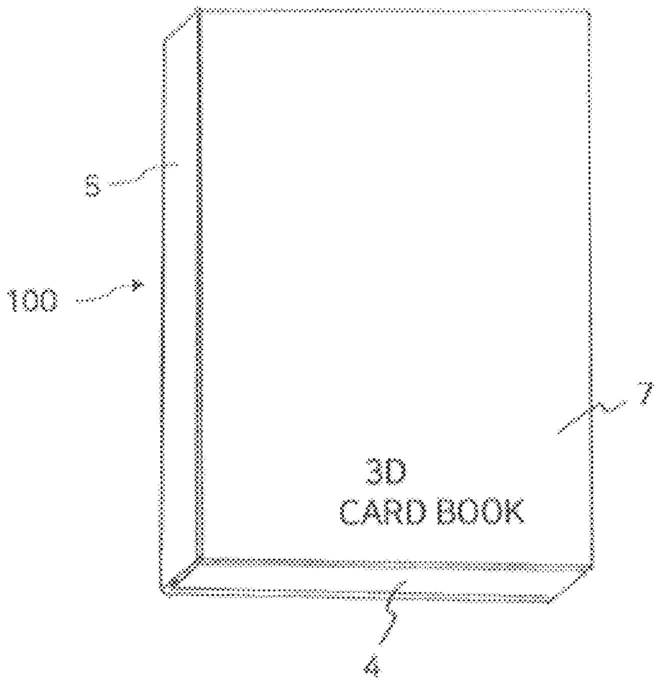
FIG. 6B is a coupling explanatory diagram of a book case and the 3D observation device case.

With the same logic, the book case 100 having a size of 240×150 mm as in FIGS. 6A and 6B may be applied up to a size of 257 mm×182 mm, which is a A4 plate as a printed matter plate type, to be published as a publication.

When the handle 14 of the 3D observation device 300 is configured to be coupled and separated, the book case 100 may be applied to more diverse book plate-type standards.

Numerical values implemented as above are only examples of implementations and are applied with the same logic when a new sized plate-type or a new standard 3D collection card is released.

The present invention is likewise applied to a case where the structures of the book covers 7 and 7*a* are made of transparent plastic.

Further, the numerical values given in the present invention are not intended to be limiting, and may be applied variably within the logic of the present invention as the numerical values given for convenience of description.

Therefore, according to the present invention, the 3D observation device 300 composed of the thin-film blocking film 15, the fixing device 17 to which the resilient device is attached, and the left and right lens plates 19 and 21 is mechanically rigid in structure while being concisely composed of the blocking film 15 of a minimum volume, so that the weight is reduced to ⅓ of the weight of the existing 3D device, and thus children and the elderly may also use the present invention lightly with one hand by a handle.

In addition, with respect to the 3D image of the present invention provided by the printed matter mounted on the 3D observation device 300 as shown in FIGS. 1A and 1B, and FIG. 3, a clear image may be observed by ambient external light without a self-light source or a transmitted light source, and the 3D image of the present invention may be mass-produced in a printed form unlike a film structure.

In addition, in the present invention in which the front-rear length b of the blocking film 15 and the focal length c of the left and right lenses 20 and 22 are configured to be the same as in FIG. 4, when the left and right lenses 20 and 22 are deployed, the focal length of the left and the right lens 20 and 22 is automatically matched with the position of the 3D collection card 200, so that the 3D image may be easily observed.

Further, multiple 3D cards 200 as illustrated in FIG. 5A and the 3D observation device 300 as illustrated in FIG. 5B may be subjected to a product-unit as the separate book case 100, and as illustrated in FIGS. 6A and 6B, the 3D card 200 and the 3D observation devices 300 are constituted in one book case 100 to be subjected to the product unit as the book.

In addition, since the present invention is provided in a size 30 times larger than that of a conventional film wheel type 3D view device, the audiovisual effect is 30 times or more, and such audiovisual effect has a very large educational effect when used for education.

What is claimed is:

1. A 3D collection card system, comprising:
3D collection cards;
a 3D observation device; and
a case in the form of a book having a cover, the case storing the 3D collection cards and the 3D observation device
the book case includes a card case storing the 3D collection cards and a 3D device case storing the 3D observation device;
wherein each 3D collection card is configured in a vertical direction, and a left-eye picture and a right-eye picture are formed on both left and right sides of a center line,
the 3D observation device has a handle at a lower portion of a blocking film,
left and right lens plates provided with left and right lenses are provided at a front end of the blocking film so as to be folded on both the left and right sides of the blocking film,
a fixing base which pulls in and fixes the 3D collection card is formed at a rear end of the blocking film.

2. The 3D collection card system of claim 1, wherein the 3D collection cards are configured to be stored in a separate card case.

3. The 3D collection card system of claim 1, wherein the 3D observation device is configured to be stored in a separate 3D device case.

* * * * *